US007549275B2

(12) United States Patent
Monti

(10) Patent No.: US 7,549,275 B2

(45) Date of Patent: Jun. 23, 2009

(54) MACHINE FOR FILLING AND CLOSING CONTAINERS

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 0 days.

(21) Appl. No.: 12/016,265

(22) Filed: Jan. 18, 2008

(65) Prior Publication Data

US 2008/0184668 A1 Aug. 7, 2008

(30) Foreign Application Priority Data

Feb. 7, 2007 (IT) .......................... BO2007A0071

(51) Int. Cl.
*B65B 3/28* (2006.01)
*B65B 5/06* (2006.01)
*G01G 13/24* (2006.01)

(52) U.S. Cl. .......................... 53/502; 53/267; 53/284.5; 177/53; 177/62; 198/358

(58) Field of Classification Search ................... 53/287, 53/502, 510, 110, 267, 284.5; 177/52, 53, 177/62; 198/349, 358, 370.01, 370.08
See application file for complete search history.

(56) References Cited

U.S. PATENT DOCUMENTS 3,073,398 A * 1/1963 Blodgett et al. ............... 177/53
3,477,192 A * 11/1969 Brown et al. .................. 53/432
4,344,493 A * 8/1982 Salmonsen et al. ............ 177/52
4,409,775 A * 10/1983 Brody et al. .................. 53/167
4,691,496 A 9/1987 Anderson
5,020,303 A * 6/1991 Vokins ........................ 53/432
5,195,294 A * 3/1993 Baranowski ................. 53/167
5,806,287 A * 9/1998 Trechsel ...................... 53/502
5,896,727 A * 4/1999 Egli et al. ..................... 53/426
6,457,299 B1 * 10/2002 Schwenke et al. ............. 53/510
6,494,017 B1 * 12/2002 McGrath et al. ............... 53/53
6,800,818 B2 * 10/2004 Balboni et al. ................ 177/52
2005/0042710 A1 * 2/2005 Oshima et al. ................ 435/31

FOREIGN PATENT DOCUMENTS

DE 103 30 700 A1 1/2005

* cited by examiner

*Primary Examiner*—Paul R Durand
(74) *Attorney, Agent, or Firm*—William J. Sapone; Coleman Sudol Sapone P.C.

(57) ABSTRACT

A machine for filling and closing containers comprises: a conveyor, step-activated in an advancement direction, laterally provided with a plurality of gripping devices which grip containers at an active branch of the conveyor. A filling station has a plurality of nozzles for filling the containers, and weighing devices for detecting a correct filling of the containers. A closing station has capping devices for closing the filled containers with caps, and sensors to detect correct closure. A release station, located downstream of the closing station has manipulators which are either de-activated to allow transit of incorrectly filled and/or closed containers, which are released onto a reject conveyor downstream and in line with the active branch; or activated transversally to the advancement direction to collect correctly filled and closed containers and release them onto an outlet conveyor, adjacent and parallel to the reject conveyor.

12 Claims, 8 Drawing Sheets

MACHINE FOR FILLING AND CLOSING CONTAINERS

BACKGROUND OF THE INVENTION

The invention relates to the technical sector concerning machines for filling and subsequently closing containers, with special reference to machines operating in a sterile atmosphere.

The aim of the present invention is to provide a machine for filling, preferably with liquid and/or granular and/or powder substances, and for subsequently closing containers which enables a maximum level of container sterility prior to the filling and closing stage to be obtained, independently of the nature of the substances dealt with.

A further aim of the present invention consists in providing a machine which can prevent any contamination of the treated substances during the stages which follow the stages of filling, and which precede the stage of closing.

A further aim of the present invention consists in providing an extremely versatile and functional machine which can guarantee easy and rapid installation and maintenance interventions thereof.

The above aims are obtained according to the contents of the appended claims.

SUMMARY OF THE INVENTION

A machine for filling and closing containers comprises: a first conveyor, activated in a variable operating step, able to move a plurality of containers in an advancement direction, towards a gripping station; a second conveyor, located downstream of the first conveyor, step-activated in phase with the first conveyor and ring-winding in a substantially horizontal plane and laterally provided with a plurality of gripping and supporting devices able to receive, at the gripping station, containers released by the first conveyor; the second conveyor identifying an active branch in which the containers supported by the gripping devices are arranged in line with the first conveyor, and moved in the same advancement direction and are interested by a main gas flow, substantially vertically directed, of a sterile substance; a filling station, collaborating with the active branch and located downstream of the gripping station, in which filling station a plurality of nozzles operate, which plurality of nozzles perform a batched filling of the underlying containers with a liquid and/or granular and/or powder product, and weighing organs which detect a correct filling of the containers; a closing station, interested by the active branch and located downstream of the filling station, in which closing station capping organs operate, which capping organs can pick up caps from a store, bring the caps in proximity of the opening mouths of the containers, and press-insert the caps in the mouths in order to close the containers; and sensors which can detect correct closure of the containers by the capping organs; a release station, collaborating with by the active branch and located downstream of the closing station, in which manipulator organs operate which, according to at least signals coming from the weighing organs and/or the sensors, are maintained deactivated in order to allow transit of containers which have been found to have incorrect filling and/or closing parameters, which containers are thus released onto a reject conveyor downstream of and in line with the active branch of the second conveyor; or the manipulator organs are activated in a transversal direction with respect to the advancement direction, in order to pick up from the active branch the containers for which correct filling and closing parameters have been detected, releasing the containers onto an outlet conveyor, adjacent and parallel to the reject conveyor.

BRIEF DESCRIPTION OF THE DRAWINGS

The characteristics of the invention will emerge in the following description of some preferred but not exclusive embodiments thereof, made with reference to the accompanying figures of the drawings, in which.

DESCRIPTION OF THE PREFERRED EMBODIMENTS

Figure 1A:
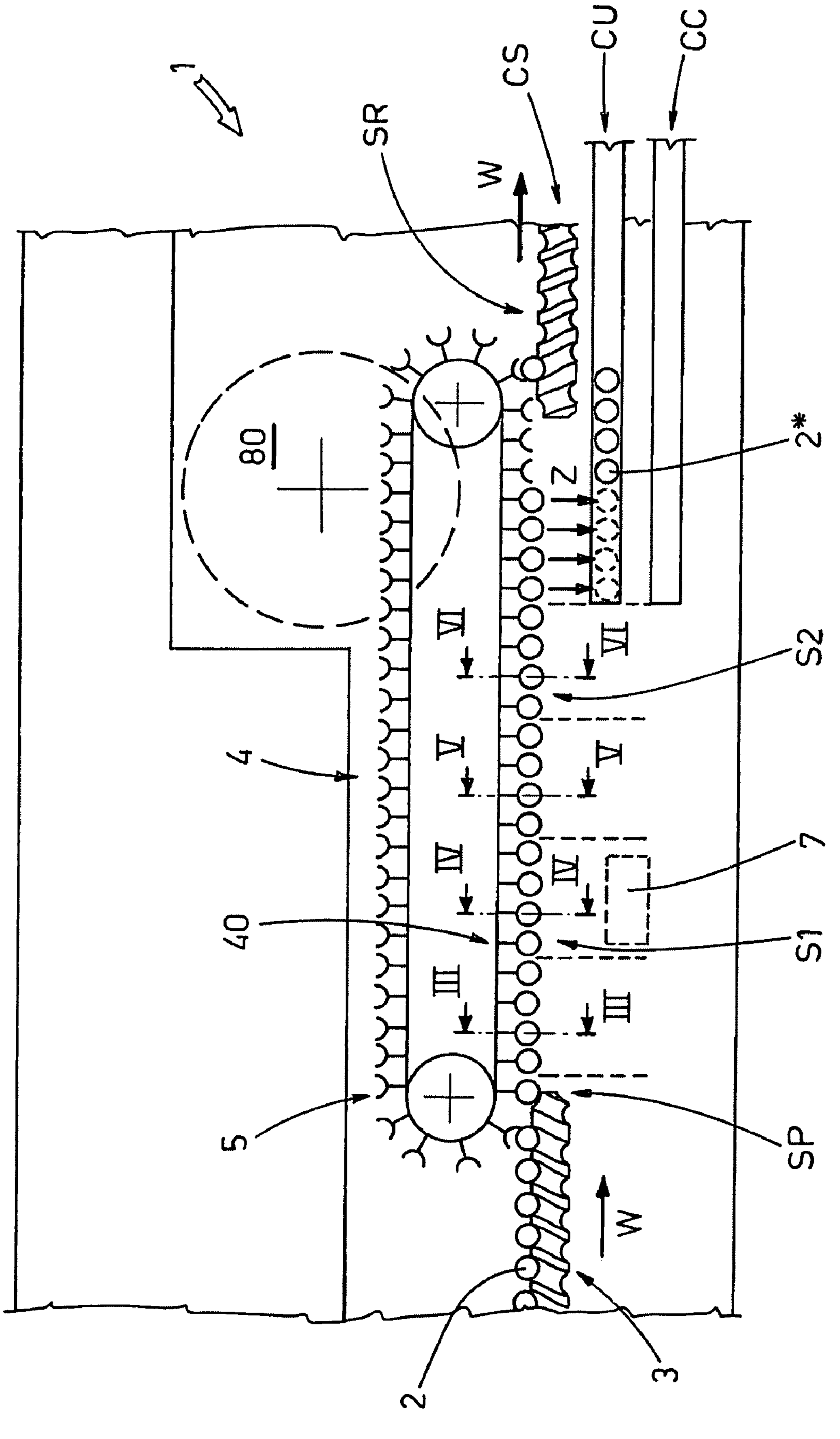
FIGS. 1A, 1B schematically illustrate two plan views of a first embodiment of the machine in two operative stages.

With reference to the figures of the drawings, 1 denotes in its entirety the machine for filling and closing containers of the invention, comprising a first conveyor 3, activated at a variable operating step, which moves a plurality of containers 2 along an advancement direction W, towards a gripping station SP; and a second conveyor 4, located downstream of the first conveyor 3 and step-activated in phase therewith, which is ring-wound in a substantially horizontal plane and is laterally provided with a plurality of gripping devices 5 which can receive, at the gripping stations SP, containers 2 released by the first conveyor 3. In FIGS. 1A, 1B, 2A, 2B the first conveyor 3 is an archimedes screw which advances the containers 2, for example coming from a sterilizing station, not illustrated, located upstream.

The second conveyor 4 includes an active branch 40 in which the containers 2 supported by the gripping devices 5 are arranged in line with the first archimedes screw conveyor 3 and moved in the same advancement direction W; the active branch 40 of the second conveyor 4 is invested by a main gas flow FP of a sterile substance, for example air.

The main flow FP of sterile air, preferably laminar, is vertically directed from above downwards, such as to interest the containers 2 borne by the gripping devices 5 both internally and externally.

Figure 4:
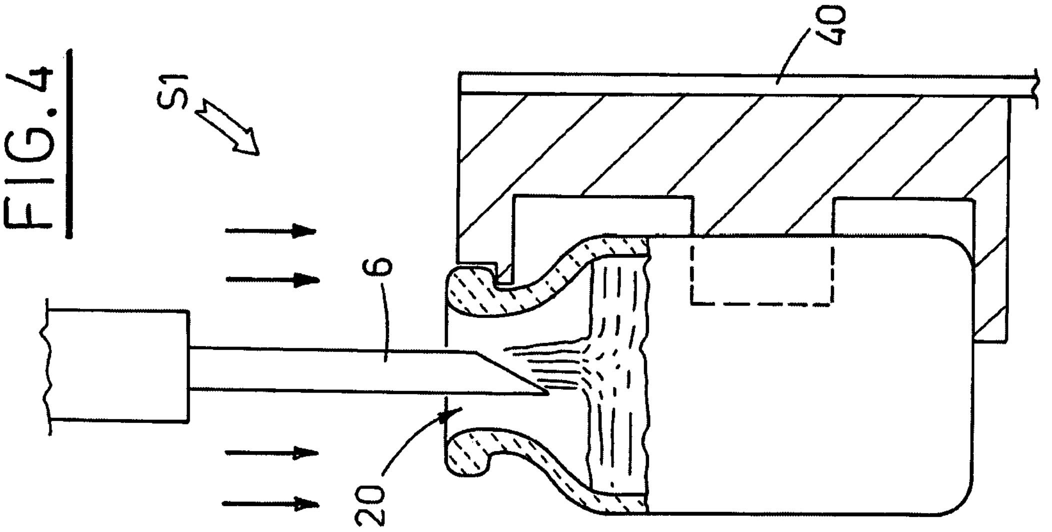

The machine 1 is also provided with a filling station S1, located along the active branch 40 and downstream of the gripping station SP, in which a plurality of vertical nozzles 6 operate, which nozzles 6 are vertically mobile in nearing and distancing to and from the active branch 40, and which nozzles 6 are destined to fill the containers 2 with a measured batch of liquid and/or granular and/or powder substances; and weighing organs 7 which detect that the containers 2 have been correctly filled (FIG. 4).

A closing station S2 is located downstream of the filling station S1, also along the active branch 40, in which capping organs operate, which remove caps 8 from a store 80, bring the caps 8 in proximity of the mouths 20 of the containers 2 and press-insert the caps 8 in the mouths 20 in order to close the containers 2; and sensor organs 9 which detect that the containers 2 have been correctly closed by the capping organs.

The capping organs and the special gripping devices 5 will be described in more detail herein below.

In a special embodiment, the store 80 of the caps 8 is invested by the same main laminar flow FP of air that strikes the active branch 40.

A release station SR is located downstream of the closing station S2, which release station SR is also located along the active branch 40. Manipulating organs operate in the release station SR, which manipulating organs, in response to signals coming from the weighing organs 7 and/or the sensors 9: are kept deactivated in order to allow transit of containers 2 which have been detected as having incorrect filling and/or capping parameters, these containers 2** being released onto a reject conveyor CS downstream of and in line with the active branch 40; or they are activated in a transversal direction Z with respect to the advancement direction W in order to remove from the active branch 40 those containers 2*** which have been detected as having correct filling and closing parameters, and to release them onto an outlet conveyor CU which is adjacent and parallel to the reject conveyor CS.

The filling and closing parameters of the containers 2 are measured in the filling station S1 and the closing station S2, respectively by the weighing organs 7 and the sensors 9, of known type.

The weighing organs 7, for example, use known ways to evaluate the weight of the containers before and after the filling operation, in order to determine via the resulting weight difference the quantity of liquid and/or granular and/or powder substance that has been inserted in the container.

The sensors 9, for example, use known ways to determine a correct positioning of the closing caps 8 by evaluating the profile thereof after they have been positioned on the mouth 20 of the containers 2.

The containers 2* which effectively contain the predetermined quantity of liquid substance and which also have correctly-positioned caps 8 are considered acceptable and are normally transferred by the manipulating organs in a transversal direction Z on the outlet conveyor CU.

The containers 2 which do not contain the predetermined quantity of liquid and/or which exhibit closure caps 8 positioned incorrectly are not considered acceptable; they are kept on the active branch 40 up to the end, at which they are released onto the reject conveyor CS located downstream of and in line with the active branch 40**.

Figure 1B:
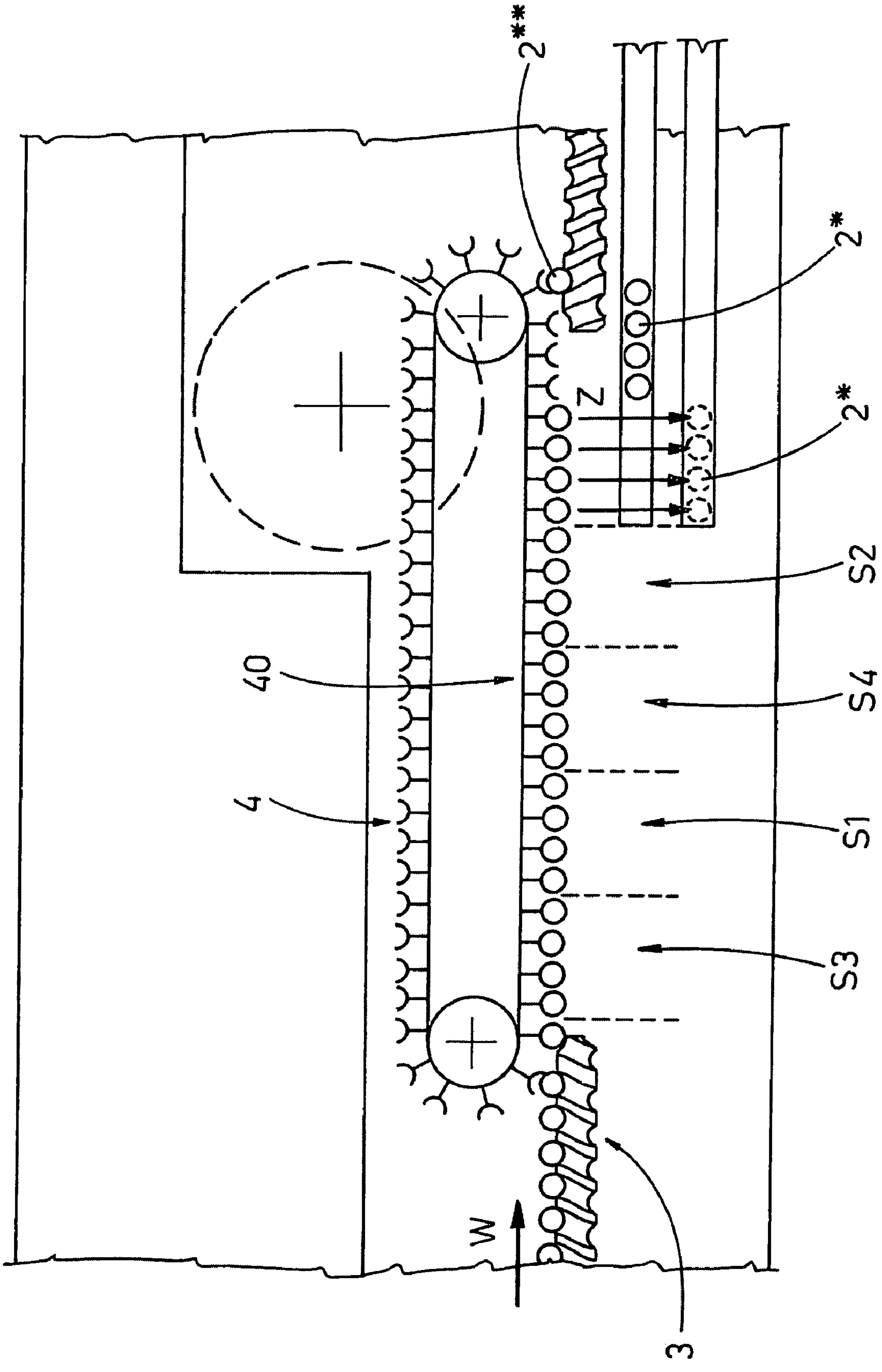

A further conveyor, being a sampling conveyor CC, is located in proximity of and parallel to the reject conveyor CS and the outlet conveyor CU; the sampling conveyor CC receives, from the manipulating organs, samples of correctly-filled and correctly-capped containers 2* removed from the active branch 40 (FIGS. 1A, 1B).

The sampling can be cyclically set, or can be random, according to the production process.

In FIGS. 1A, 1B, and in agreement with a first embodiment of the machine 1, the outlet conveyor CU is interposed between the remaining conveyors, i.e. the reject conveyor CS and the sampling conveyor CC.

Figure 2A:
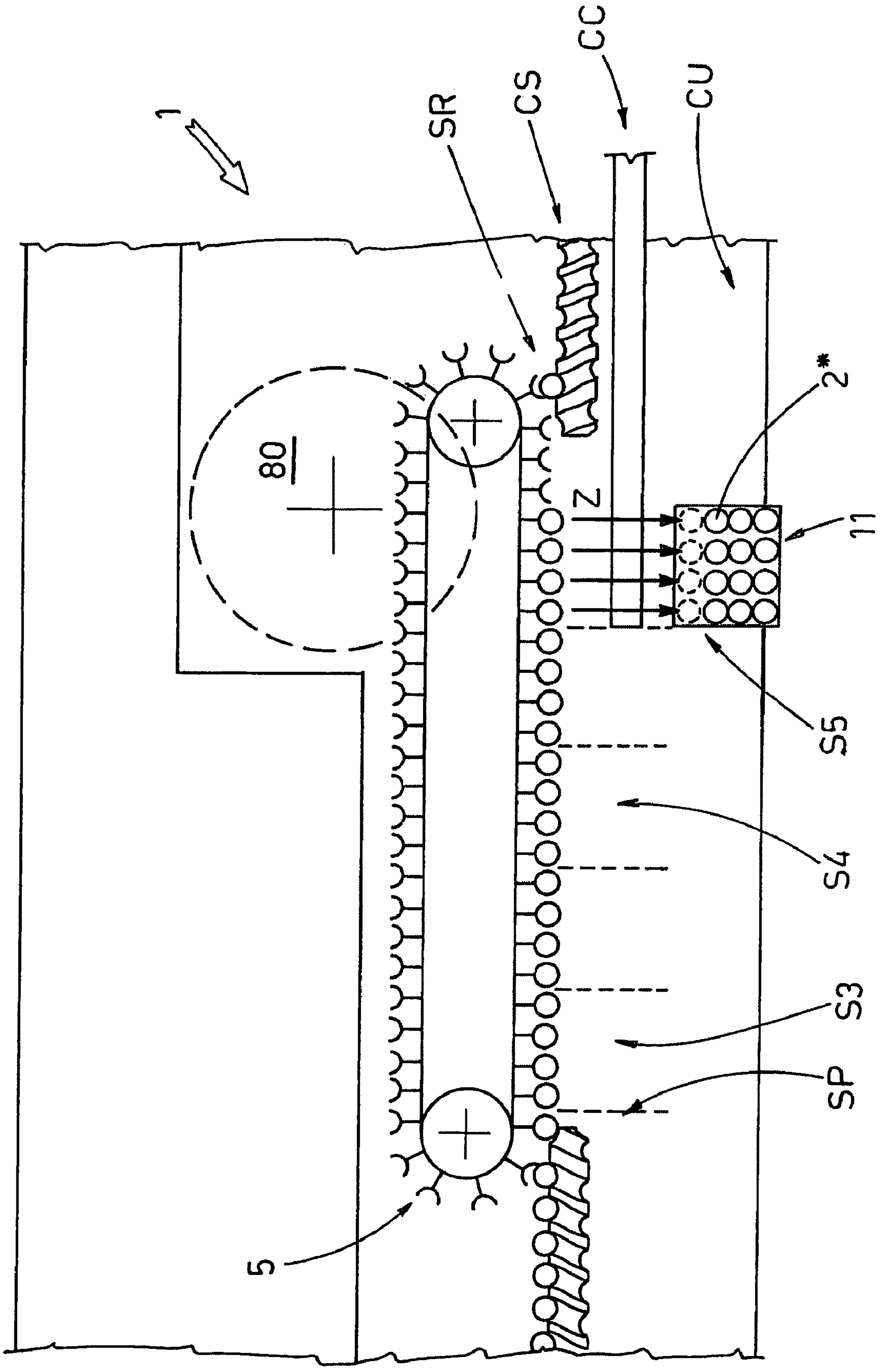
FIGS. 2A, 2B schematically represent two plan views of a second embodiment of the machine in two operative stages.
Figure 2B:
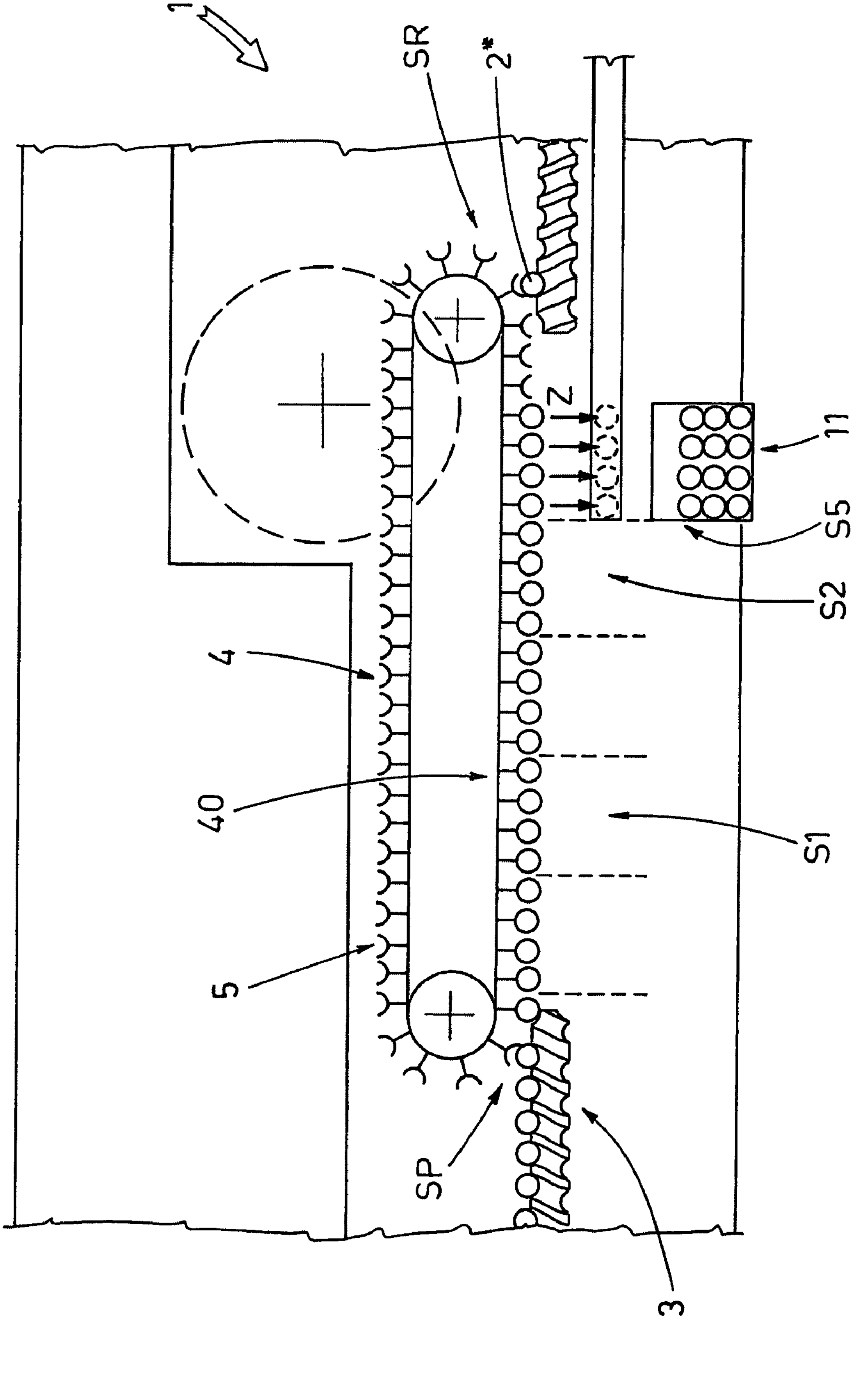

On the contrary, in FIGS. 2A, 2B, in a second embodiment of the machine 1, the sampling conveyor CC is interposed between the remaining conveyors, i.e. the reject conveyor CS and the outlet conveyor CU.

In this case, the outlet conveyor CU is associated to a storage station S5 in which the manipulator organs release the containers 2* into collection crates, the containers 2* being those removed from the active branch 40 i.e. those having correct filling and closure parameters.

Figure 3:
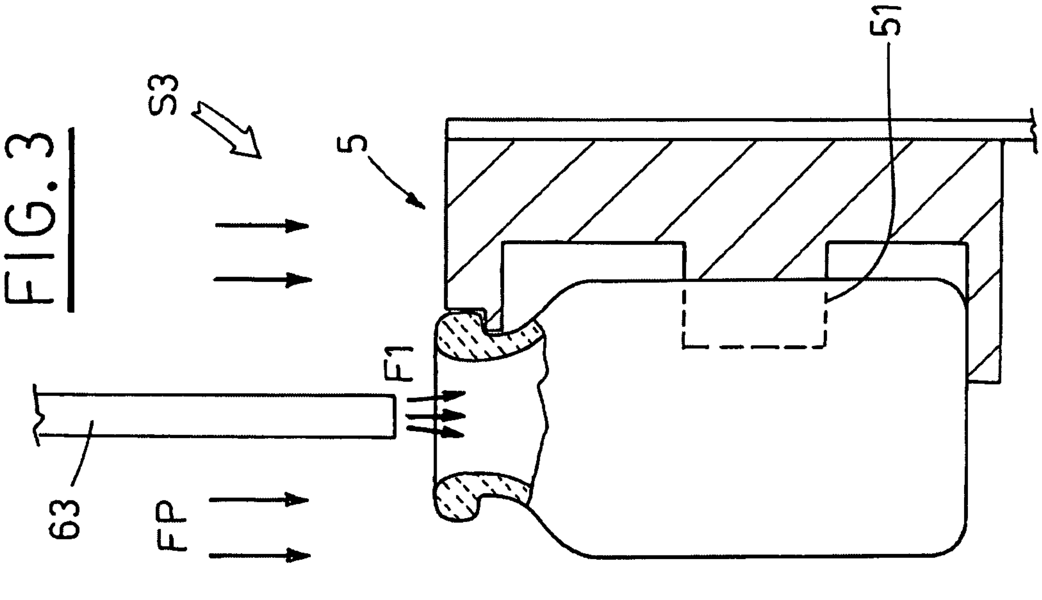

The machine 1 advantageously includes a first sterilizing station S3 interposed between the gripping station SP and the filling station SI, in which the empty containers 2 borne on the active branch 40, before filling thereof, are struck by a vertically-directed first supplementary gas flow F1 of an inert sterile substance (FIG. 3).

The first supplementary gas flow F1, for example nitrogen, is dispensed by a plurality of nozzles 63 located in proximity of the opening mouths 20 of the underlying empty facing containers, prevalently striking internal regions thereof.

In this way, should it be necessary, any traces of mixtures of oxygen can be removed from the insides of the empty containers 2, which oxygen might subsequently oxidize the substances injected at the filling station S1.

Figure 5:
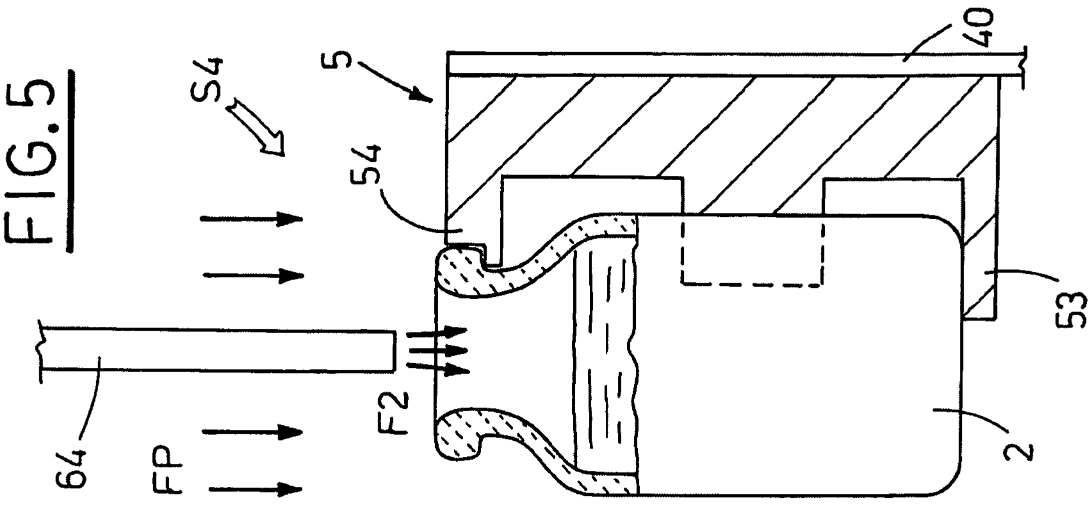
FIGS. 3, 4, 5, 6 are views in enlarged scale of four views along sections III-III, IV, IV, V-V, VI-VI, indicated in FIG. 1A.

The machine 1 advantageously includes a second sterilizing station S4, interposed between the filling station S1 and the closing station S2, in which the filled containers borne by the active branch 40, before closure thereof, are struck by a vertically-directed second supplementary gas flow F2 of an inert sterile substance (FIG. 5).

The second supplementary gas flow F2, for example also nitrogen, is dispensed by a plurality of nozzles 64 located in proximity of the opening mouths 20 of the underlying filled containers 2, and prevalently strike the portion of internal region of the containers delimited by free surface of the substances contained in the containers 2.

As for the closing station S2, the capping organs operating there-at are preferably made in accordance with document BO 2007 A 000044 in the name of the present applicant, as will be specified in more detail herein below.

The gripping devices 5 in the above-cited document each comprise a longitudinally-developing body 50 which comprises: inferiorly a support base 53 for receiving, partially restingly, the bottom of the containers 2; centrally a pair of stiff wings 51 able to encounter the bodies of the containers 2; and superiorly a sort of pliers 54 which can grip the necks of the bottles 2.

In the closing station S2, a lateral guide wall 12 is provided to guide the containers 2, which guide wall 12 extends parallel to the active branch 40 of the second conveyor 4, laterally encountering the bodies of the containers 2, and a fixed support 13 which flanks the support base 53 of each gripping device 5 and cooperates there-with in order to support the containers 2 on closing thereof.

Each gripping device 5 includes, on the side thereof opposite the pliers 54, a hooking and receiving organ 14 for a corresponding cap 8 of the type constituted by a cylindrical body associated to a large-diameter cylindrical head.

Figure 7:
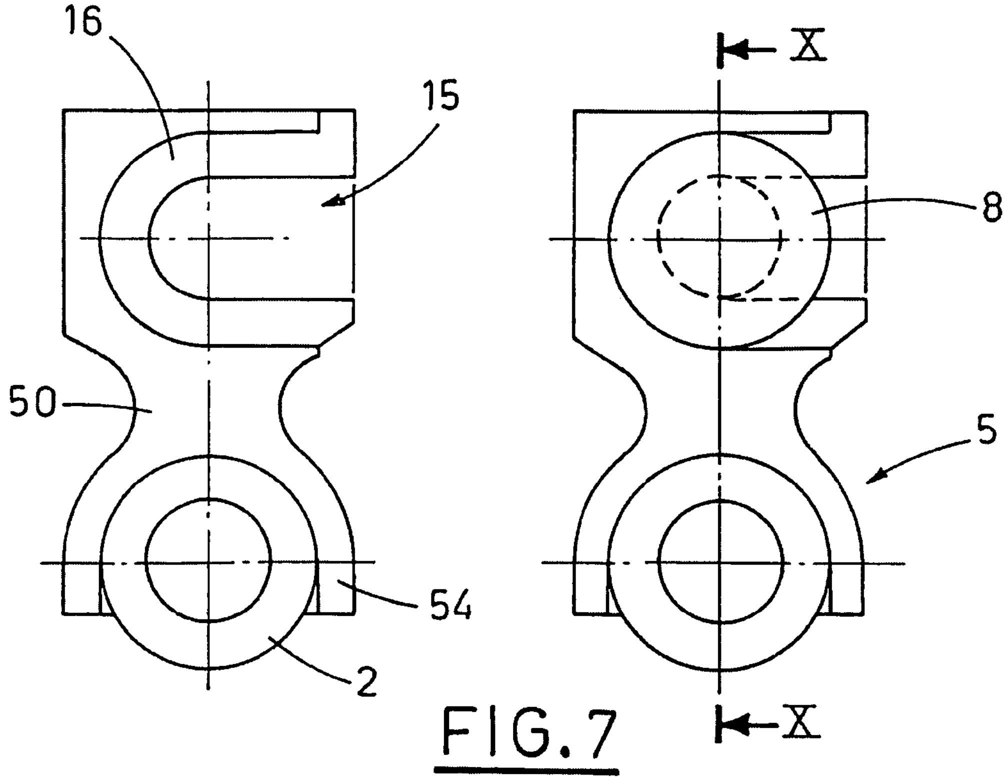
FIG. 7 is a view from above, in the same view as FIG. 6, of the gripping devices of the containers operating in the closing station.

The hooking and receiving organ 14 affords a housing 15 (FIG. 7) which is accessible from above and frontally, in an opposite direction to the advancement direction W.

The edge which delimits the housing 15 is shaped such as internally to exhibit a step 16 constituted by two straight lateral tracts connected by a semi-circular head, such that the housing profile 15 is able to marry the profile of the cylindrical body of the cap 8, with the cylindrical head thereof encountering the base of the step 16.

A channel 17 is provided in the closing station S2, superiorly of the second conveyor 4, which channel 17 supplies caps 8 and perpendicularly overlies the hooking and receiving organs 14 transiting below in the advancement direction W.

Figure 6:
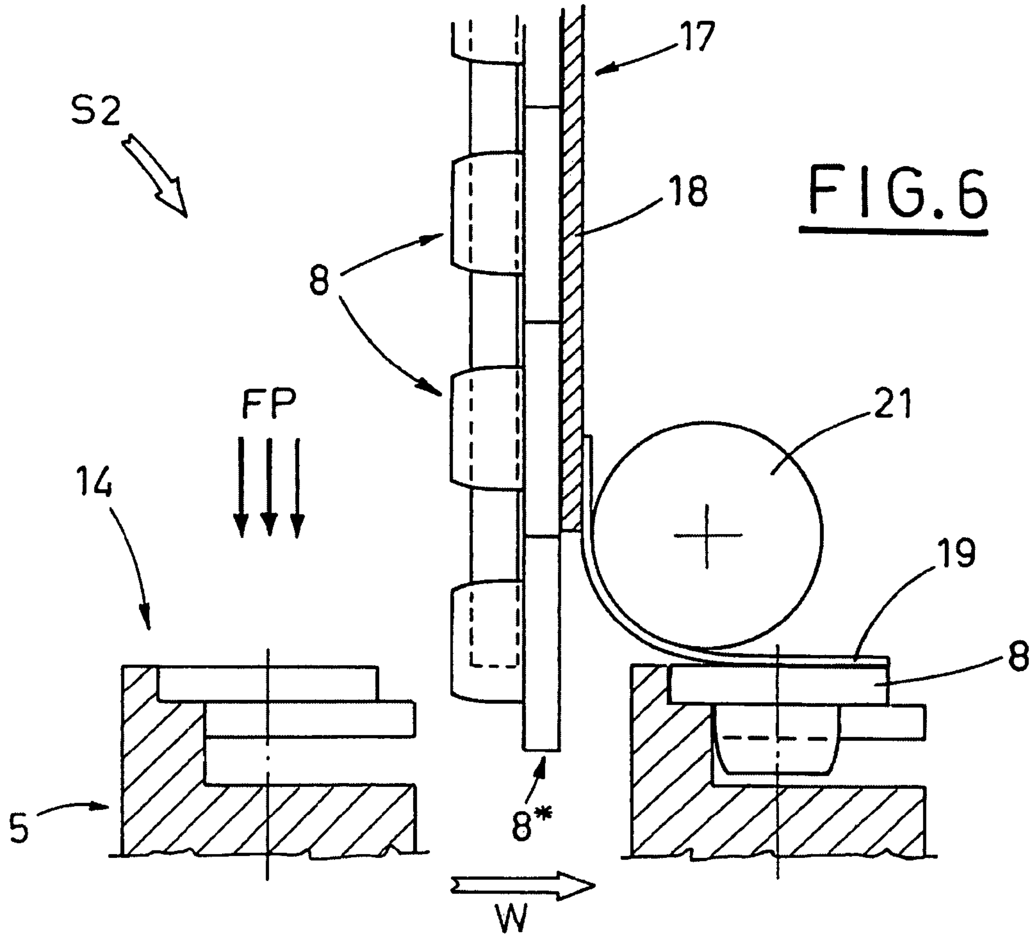

The cap supply channel 17 is defined by a vertical wall 18 associated to a pair of parallel vertical elements, lower ends of which are bent towards one another to define an elastic abutment (FIG. 9); and a curved sheet 19, anchored to the lower end of the vertical wall 18, contrasted by an idle roller 21 (FIG. 6).

A row of caps 8 is conveyed in a known way into the supply channel 17; the caps 8 have cylindrical bodies thereof facing upstream of the second conveyor 4 and the cylindrical heads thereof restrained by the pair of vertical elements.

Figure 9:
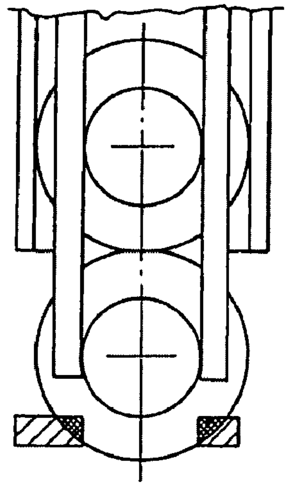
FIG. 9 is the view along section IX-IX of FIG. 8.

The first cap 8* of the row of caps 8 is held by the elastic pressure exerted by the lower ends of the pair of vertical elements (FIG. 9).

Figure 8A:
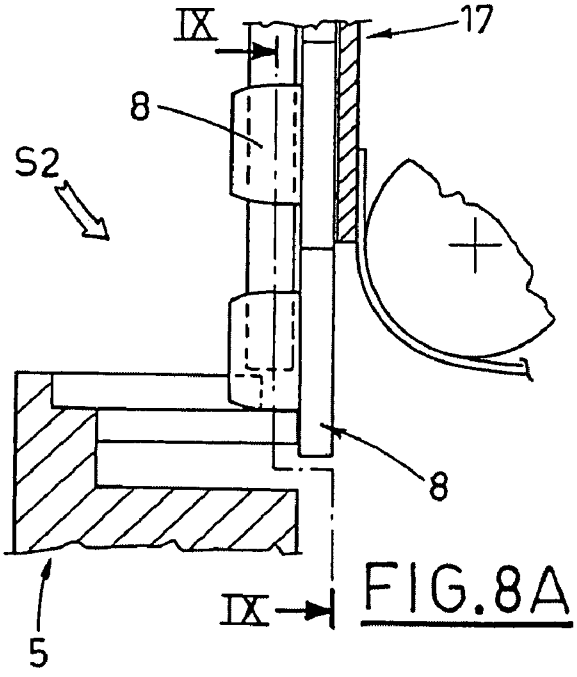
FIGS. 8A, 8B, 8C schematically illustrate further views in partial lateral section of successive operating stages of the closing station.

With the advancing of the active branch 40 in the advancement direction W, the front head of the hooking and receiving organ 14 located upstream of the supply channel 17 intercepts the internal surface of the head of the front cap 8*(FIGS. 8A, 9).

Figure 8B:
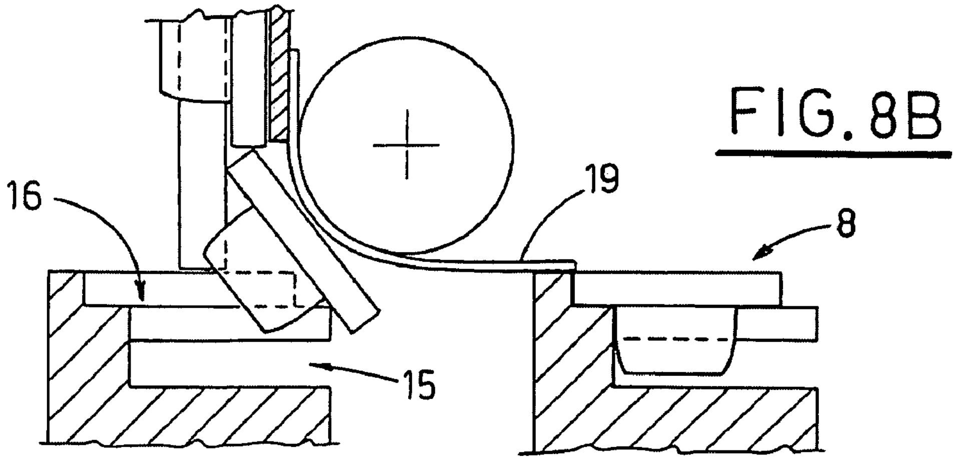
Figure 8C:
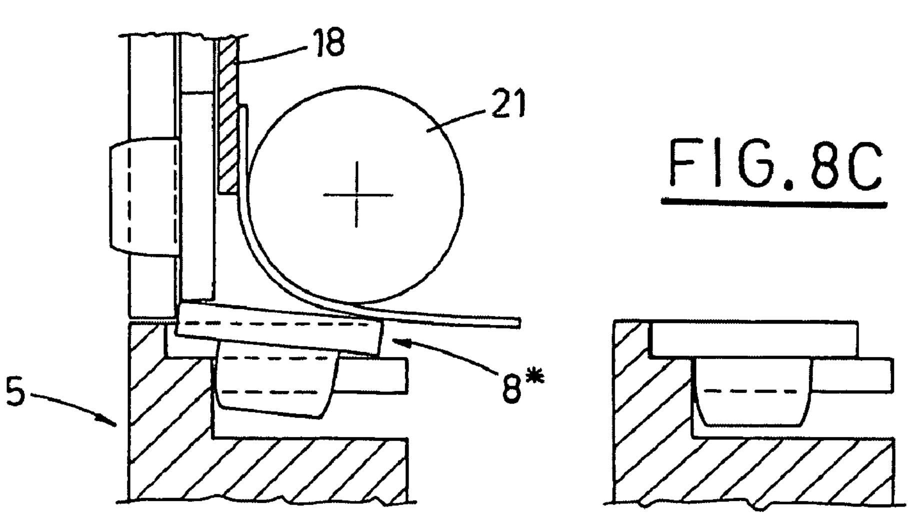

The intercepting, in combination with the advancing of the active branch 40 and for the combined action exerted by the sheet 19 and the pair of vertical elements (see FIG. 8B), causes a gradual anticlockwise oscillation of the cap 8*(with reference to FIGS. 8A, 8C) up to the insertion of the cylindrical body in the housing 15 and on the meeting of the head against the base of the step 16 (FIG. 8C).

Figure 10B:
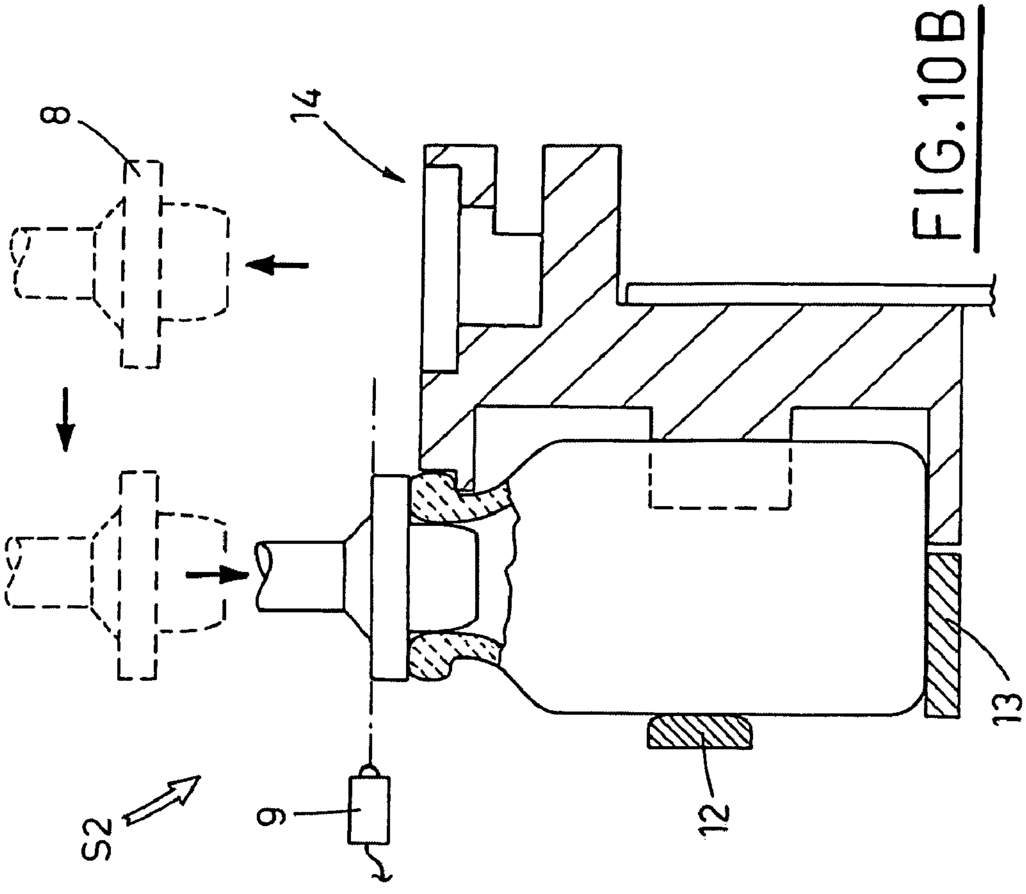
FIGS. 10A, 10B show further views along section X-X of FIG. 7, of successive operating stages of the closing station.
Figure 10A:
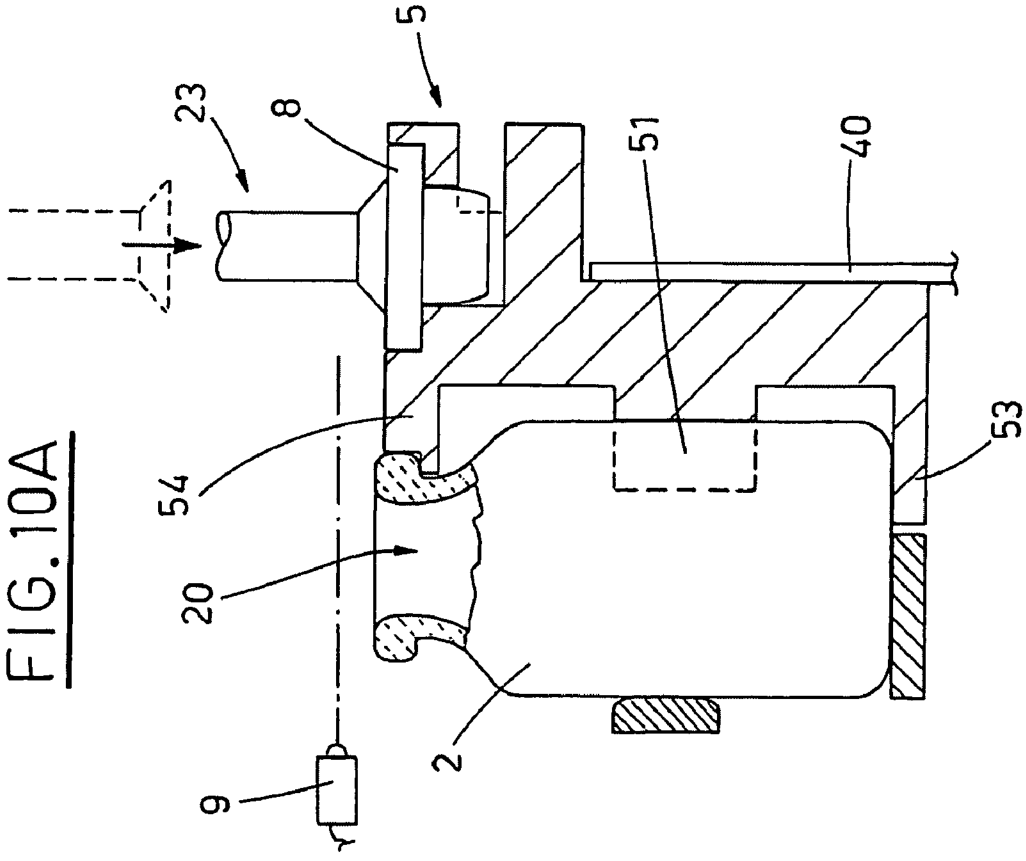

Following positioning of the caps 8 in the corresponding hooking and receiving organs 14, collecting organs 23 of known type (FIGS. 10A, 10B), located downstream of the supply channel 17 and arranged coaxially with the hooking and receiving organs 14, lower to hook the caps 8 in the housings 15, extracting them from the housings 15 and raising them vertically.

The collecting organs 23 then translate transversally to the advancement direction W (FIG. 10B) in order to position the caps 8 in proximity of the inlet mouths 20, axial there-with, of the corresponding containers 2, then to descent and enable insertion of the cylindrical bodies of the caps 8 in the mouths 20 of the containers 2.

During this stage the support 13, adjacent to the bases 53 of the gripping devices 5, contrasts (in association with the bases 53) the force exerted on the container 2 following the action of the collecting organ 23.

Alternatively, in a non-illustrated embodiment, each gripping device 5 can include, associated to the body 50 together with the support base 53, a pair of wings 51 which can elastically deform in order to hook and/or unhook the bodies of the containers 2 via a snap-mechanism, as described in document EP 06126770.4 in the name of the present applicant.

In the accompanying figures of the drawings, the machine 1 has been illustrated with an operating step which is four times the elementary interaxis between the gripping devices 5; the functioning principle is the same for an operating step which is "n" times the elementary interaxis.

In the present case (n=4) a gripping of four new containers 2 corresponds to an operating step of the first screw conveyor 3, the containers 2 being gripped by active branch 40 of the second conveyor 4, and the same number of groups downstream of four containers 2 are subjected to the action of the first sterilizing station S3, the filling station S1, the second sterilizing station S4, the closing station S2 and the release station SR, as described herein above.

During a rejection phase, for example, the manipulator organs can release onto the relative reject conveyor CS only reject containers 2 for which incorrect parameters of filling and closure were detected, or all of a "defective step" which contains unacceptable containers 2****.

In the first case the containers 2* which are acceptable in the "defective step" are transferred to the outlet conveyors CU, or the sampling conveyors CC; while in the second case the "defective step" transfers no acceptable containers 2*.

The machine 1 can also function with a smaller operating step (n<4), for example having a step which is equal to two or three times the elementary interaxis.

The machine 1 in particular enables a regulation of the advancement step of the first conveyor 3 and the second conveyor 4, according to the type and/or the quantity of the substances to be batched into the containers 2 at the filling station S1.

The time that passes between two successive step-activations is given by the sum of the time necessary for mechanically advancing the second conveyor 4 and the time necessary for terminating the stages of filing (S1) and/or closing (S2).

With reference to the accompanying figures of the drawings, this means that for substances which are difficult to batch (high granulometry parameters, viscosity, density, etc.), and/or for relatively high volumes to be batched, the machine 1 can be adjusted to an operating step which is, for example, equal to or twice the elementary interaxis between the gripping devices 5 (n=1, 2). In this case, by limiting the operating step with which the conveyors (3, 4) are activated in synchrony, thus the mechanical advancement time thereof, it is possible to increase the length of the pause of the containers 2 in the filling station S1, and thus the time required for filling the containers 2.

Similarly, for substances with relatively simple batches (small granulometry, viscosity, density, etc.), and/or for relatively limited volumes to be batched, the machine 1 can be regulated with an operating step which is, for example, three or four (maximum value) times the elementary interaxis between the gripping devices (n=3, 4). In this case, while keeping the operating step with which the transporters (3, 4) are synchronically activated high, close to the maximum values, thus the mechanical advancement time thereof, it is possible to reduce the length of time the containers 2 pause in the filling station S1, i.e. the time required for filling them.

In the accompanying figures of the drawings, rigid containers 2 are shown, for example bottles and/or vials, but the machine 1 is also able to deal with soft containers 2, when equipped with special gripping organs 5.

According to needs, in a further embodiment, one or both sterilizing stations S3, S4 of the machine 1 can be removed.

From the above description the machine for filling, preferably with liquid and/or granular and/or powder substances, and the subsequent closure of containers, provides a maximum level of container sterility prior to the filling and closing stages, independently of the nature of the treated substances.

The first sterilizing station is particularly advantageous, as it subjects the empty container, previously exposed to the main gas flow, to a first supplementary flow of an inert sterile substance which mainly involves the internal region of the containers.

The machine of the invention prevents any contamination of the substances dealt with during the stages which follow the stages of filling and which precede the closing stage.

The second sterilizing station is particularly advantageous, as it subjects the filled containers, already exposed to the main gas flow, to a second supplementary flow of an inert sterile substance which mainly involves the internal region of the containers delimited by the free surface of the substance contained therein.

The machine is extremely versatile and functional, able to operate with a variable operating step, requiring, for its simple and compact structure, particularly easy and rapid installation and maintenance operations.

The invention has obviously been described with reference to the accompanying figures of the drawings by way of non-limiting example, and it is thus evident that all modifications and variants can be brought thereto, all comprised within the ambit defined by the following claims.

What is claimed is:

1. A machine for filling and closing containers comprising:

a first conveyor, activated in a variable operating step, for moving a plurality of containers in an advancement direction, towards a gripping station;

a second conveyor, located downstream of the first conveyor, step-activated in phase with the first conveyor and ring-wound in a substantially horizontal plane and laterally provided with a plurality of gripping and supporting devices able to receive, at the gripping station, containers released by the first conveyor; the second conveyor having an active branch in which the containers supported by the gripping devices are arranged in line with the first conveyor, the containers moved in the same advancement direction, the active branch with said containers being subjected to a main gas flow, substantially vertically directed, of a sterile substance;

a filling station, located along the active branch and downstream of the gripping station, the filling station having a plurality of nozzles operated for batched filling of the containers located at said filling station with a product, and weighing devices which detect a correct filling of the containers;

a closing station, located along the active branch and downstream of the filling station, the closing station having capping devices operated to pick up caps from a store, bring the caps in proximity of opening mouths of the containers, and to press-insert the caps in the mouths to close the containers; and sensors for detecting correct closure of the containers by the capping devices;

a release station, located along the active branch and downstream of the closing station, the release station having manipulator devices responsive to at least signals coming from the weighing devices and the sensors, the manipulator devices being either deactivated to allow transit of incorrectly filled or incorrectly closed containers a reject conveyor located downstream of and in line with the active branch of the second conveyor receiving said incorrectly filled or closed containers; or activated to operate in a transversal direction with respect to the advancement direction, to pick up correctly filled or closed containers from the active branch, an outlet conveyor, located adjacent and parallel to the reject conveyor, receiving the correctly filled or closed containers picked up by the manipulator devices.

2. The machine of claim 1, further comprising a sampling conveyor, located adjacent and parallel to the reject conveyor and the outlet conveyor, for receiving samples of containers picked up from the active branch by said manipulator devices.

3. The machine of claim 2, further comprising a first sterilizing station, located along the active branch between the gripping station and the filling station, a first supplementary gas flow, substantially directed vertically, of an inert sterile substance being directed towards empty containers borne on the active branch in said first sterilizing station.

4. The machine of claim 2, characterized in that the outlet conveyor is interposed between the reject conveyor and the sampling conveyor.

5. The machine of claim 4, further comprising a storage station, associated to the outlet conveyor, the storage station receiving collecting crates, containers picked up from the active branch by the manipulator devices being disposed in the collecting crates.

6. The machine of claim 2, characterized in that the sampling conveyor is interposed between the reject conveyor and the outlet conveyor.

7. The machine of claim 6, further comprising a storage station, associated to the outlet conveyor, the storage station receiving collecting crates, containers picked up from the active branch by the manipulator devices being disposed in the collecting crates.

8. The machine of claim 1, further comprising a first sterilizing station, located along the active branch between the gripping station and the filling station, a first supplementary gas flow, substantially directed vertically, of an inert sterile substance being directed towards empty containers borne on the active branch in said first sterilizinci station.

9. The machine of claim 8, wherein the first sterilizing station has a plurality of nozzles which dispense the first supplementary gas flow.

10. The machine of claim 8, further comprising a second sterilizing station, located along the active branch between the filling station and the closing station, a second supplementary gas flow, substantially vertically directed, of an inert sterile substance being directed towards filled containers borne on the active branch, before closure thereof, in said second sterilizing station.

11. The machine of claim 10, wherein the second sterilizing station has a plurality of nozzles which dispense the second supplementary gas flow.

12. The machine of claim 1, characterized in that the store is subjected to the main gas flow of the sterile substance.

* * * * *